Oct. 17, 1944.  D. GLAZER  2,360,559
COATED FROZEN CONFECTIONERY
Filed Sept. 25, 1943
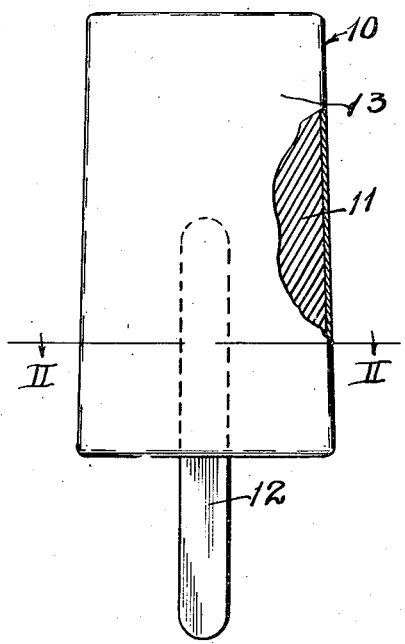
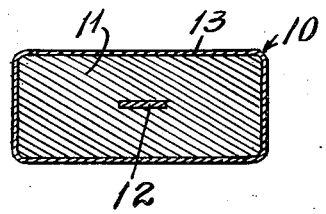
Inventor
Daniel Glazer
by Charles W Hills Attys.

Patented Oct. 17, 1944

2,360,559

UNITED STATES PATENT OFFICE 2,360,559

COATED FROZEN CONFECTIONERY

Daniel Glazer, Chicago, Ill.

Application September 25, 1943, Serial No. 503,737

9 Claims. (Cl. 99—136)

This invention relates to a coated frozen confectionery and to a method for preparing such confectionery.

Ice cream bars and the like are conventionally coated with material having an oily or fatty base such as chocolate, coconut oil, or the like. In the coating operation such oily or fatty material must be first melted by heating to a relatively high temperature, such as from 80° to 100° F. The frozen confection to be coated is usually cooled to a temperature of less than 10° F. immediately before being dipped, so that it will not melt unduly on being dipped in the melted fat.

Conventional frozen confections, such as ice cream bars, have a frozen body, or center, formed of an aqueous composition that does not blend readily with the fatty or oily coating and that, consequently, is likely to spoil the appearance of the coating. Furthermore, a fatty coating is quite brittle at freezing temperatures and does not adhere well to the solid aqueous center, with the result that the coating chips, or flakes off, very easily.

It has heretofore been proposed to employ, as a coating for ice cream bars and the like, aqueous compositions that congeal due to a considerable content of gel forming material such as gelatin, pectin, other gums or starch. However, such coatings must be supplied to the ice cream center at an undesirably high temperature and thereafter congealed by being cooled. Further, gelatin, gums, starch and the like, tend to give a finished coating that becomes sticky and adheres to the paper in which the ice cream bars, or the like, are packed. The same applies to coatings having a caramel or fondant base.

Coatings for frozen confections have also been proposed which are changed from the liquid to the solid stage by the crystallization of a crystallizable sugar contained in the coating compound and forming its basic and principal ingredient. However, such coatings, to be congealed, must be cooled to extremely low temperatures on the order of the temperature of dry ice.

Satisfactory results are not obtained by freezing an aqueous sugar solution onto an ice cream bar. For instance, if a solution of from 4½ to 6½ parts by weight of sugar in 28 parts by weight of water is frozen in successive layers onto an ice cream bar, the resultant coating takes the form of a thin sheet of ice, which is hard, cold and unpleasant on the teeth and very brittle. In effect, the resultant coating differs from a sheet of plain ice only in being sweet.

It is therefore an important object of the present invention to provide a novel frozen confectionery on the order of an ice cream bar having a coating composed of an aqueous composition which solidifies, not because of any thickening or gelatinizing agent, or because of the presence of fats, but because of the freezing of the water content itself.

Another important object of the invention is to provide a coating composition for ice cream bars or the like which is essentially aqueous in nature and which congeals due to the formation of ice crystals in a finely divided discrete condition such that the congealed coating, instead of being brittle and friable, is relatively soft and can be bitten into without the objectionable reaction that one will get in biting into plain ice coatings.

Another important object of this invention is to provide a method for coating frozen confectionery with material having an aqueous base at relatively low temperatures whereby the frozen material being coated is not likely to be melted during the coating process.

Other and further objects of the present invention will become apparent from the following description and appended claims.

I have found that frozen confections having an aqueous base, such as ice cream or the like, ices, sherbets and similar confectionery compositions, may be coated at relatively low temperatures with an aqueous coating material containing a sugar and solid constituents of milk to yield glossy, smooth, homogeneous coatings that are not to brittle as conventional chocolate coatings nor objectionably brittle and icy in a manner of plain ice coatings. Such an aqueous base coating composition may further include salt, other flavoring and coloring material. Colloidal thickening agents such as gelatin, pectin, gums, and the like may be added in relatively small amounts, say, less than 3%, but I prefer to omit all such colloidal thickening agents since they render it more difficult to control the viscosity of the composition upon standing.

The frozen confection to be coated may be dipped in coating compositions of my invention at temperatures ranging from 30° to 40° or even 50° F. to yield glossy, smooth, homogeneous coatings that blend with the frozen confection that is being coated. The coatings of this invention are not spoiled by moisture present in the confectionery being coated, nor are the coatings of this invention greasy.

The desirable properties of our novel coatings are due to the nature of the ice crystals formed therein when the coatings are congealed and not to any crystallizing out of the sugar contained in the coating material.

The preparation of a frozen confectionery according to the present invention is illustrated by the following example of the preparation of ice cream bars.

Special reference is made to the drawing, in which:

Figure 1 is an elevational view of an ice cream bar prepared according to this invention, part of the coating being broken away to show the interior solid center; and Figure 2 is a cross-sectional view taken along the line II—II of Figure 1.

In the drawing, the reference numeral 10 indicates generally an ice cream bar coated according to the present invention. This ice cream bar includes a frozen ice cream center 11 from which may project a flat wooden stick 12 intended for facilitating the grasping of the ice cream bar.

The ice cream bar further includes an exterior coating 13 having an aqueous base. The coating 13 is applied to the center 12 by dipping the center in a liquid coating composition and then withdrawing the dipped center from the coating composition. The coating composition will congeal on the outer surface of the solid center as a relatively thin outer layer.

The coating composition may be made up from a solid mixture having the following composition:

I.

| | |
|---|---|
| Cane sugar | 9 lbs. 13 oz. |
| Skim milk powder | 9 lbs. 4 oz. |
| Soy bean flour | 12 oz. |
| Salt | 3 oz. |
| Flavor and color to suit. | |
| | 20 lbs. |

The above disclosed solid mixture is added to 70 lbs. of water and the frozen ice cream centers are dipped in the resulting liquid at from 30° to 50° F. At temperatures higher than 50°, the coating composition is congealed too slowly on the bar for commercial production. Further, at temperatures in excess of 50° F., the coating produced by dipping will be too thin to be satisfactory.

The soy bean flour disclosed as an ingredient is used solely to retard foaming in the finished coating and, if desired, may be omitted. The salt is present solely for flavoring purposes.

Suitably, the coating composition is made up by adding dry ingredients to the indicated amount of hot water while agitating the resulting mass thoroughly. Preferably, the mass is pasteurized by heating between 130° and 180° F. for about one-half an hour, after which the mass is immediately cooled to about 40° F. and held at that temperature. The composition thus prepared can be used at once or may be allowed to stand at about 40° F.

In general, the water content of the coating composition as applied to the frozen confection should be between 60 and 85% by weight. Outside of these limits, the coating will be unsatisfactory for commercial purposes.

Other typical formulae for coating compositions according to the present invention are given hereinbelow:

II.

| | |
|---|---|
| Sugar | 9 lbs. 13 oz. |
| Skim milk powder | 9 lbs. 4 oz. |
| Soy flour | 12 oz. |
| Salt | 3 oz. |
| Water | 70 lbs. |
| Flavor and color to suit. | |
| | 90 lbs. |

III.

| | |
|---|---|
| Sugar | 9 lbs. 8 oz. |
| Evaporated milk | 34 lbs. |
| Salt | 3 oz. |
| Water | 46 lbs. 5 oz. |
| Flavor and color to suit. | |
| | 90 lbs. |

IV.

| | |
|---|---|
| Sugar | 7 lbs. 8 oz. |
| Cocoa | 3 lbs. |
| Soy flour | 12 oz. |
| Skim milk powder | 8 lbs. 12 oz. |
| Water | 70 lbs. |
| | 90 lbs. |

These compositions may be prepared similarly to Formula No. I disclosed hereinabove.

As pointed out hereinabove, the principal constituents of the coating compositions of the present invention are sugar, milk solids and water. The sugar content may range between 4 and 16% by weight of the coating composition, while the milk solids may range from 6 to 18% by weight of the coating composition. The exact percentage of sugar to be used will depend on the sweetness desired. Variation of the sugar content will also serve to regulate the setting time of the coating, for, other things being equal, the less sugar present, the sooner the coating will set up or freeze.

The percentage of milk solids depends on the source of milk solids used. For instance, somewhat more skim milk powder dried by the spray process will be required than that made by the roller process. If evaporated milk is used in place of skim milk powder, the equivalency is on the basis of approximately 3⅓ parts by weight of evaporated milk to 1 part by weight of skim milk powder, and, of course, a correspondingly lesser amount of water need be added. This is indicated by a comparison of the proportions shown in Examples II and III. The moisture content of evaporated milk is approximately 75% by weight.

Alternatively, instead of using skim milk or evaporated milk, whole milk may be used to furnish the milk solids and also the water content of the coating composition. The following formula illustrates the use of whole milk:

V.

| | |
|---|---|
| Whole milk | 79 lbs. 4 oz. |
| Sugar | 7 lbs. |
| Cocoa | 3 lbs. |
| Soy flour | 12 oz. |
| | 90 lbs. |

Soy bean flour may be present in percentages varying from 0.5 to 1.0% for the purpose of retarding foaming. However, if desired, the soy bean flour may be omitted.

In addition to milk solids, the coating composition may contain a cooked farinaceous product, such as cooked cornstarch, arrow root starch, tapioca or the like. Such starchy material may be used, in particular, to increase the viscosity of the coating composition.

The milk solids which are incorporated with the aqueous base coating composition serve to effect the formation of small, discrete ice crystals in the coating, thereby rendering the coating softer and more pleasing to the taste than if a solid sheet of ice were formed. One advantage of using a composition containing milk solids is that the coating has a similar taste to that of the ice cream itself.

The thickness of the coating produced by dipping a bar of ice cream or the like in the coating material of this invention may be controlled by regulating the dipping temperature, by adding more or less water to the coating composition, by varying the nature and amount of starchy or other thickening agent present in the coating composition, or by other means.

The coating methods of this invention offer a great advantage over the conventional methods of coating ice cream bars or the like with standard material, such as chocolate, in that coating according to the present invention can be carried out at relatively low temperatures so that there is not so much danger of having the ice cream melt. The coatings produced according to the present invention are not greasy, are not so brittle as oily coatings, and may be produced with any desired thickness, color or flavor.

Many details of composition and procedure may be varied within a wide range without departing from the principles of this invention, and it is therefore not my purpose to limit the patent granted on this invention otherwise than necessitated by the scope of the appended claims.

This application is a continuation-in-part of my prior copending application Serial No. 459,077, filed September 21, 1942.

I claim as my invention:

1. A frozen confection coating consisting of an aqueous composition having dispersed therein from 4 to 16% by weight of sugar and from 6 to 18% by weight of milk solids, the water content in said coating being between 60 and 85% by weight of said composition, and the coating when applied to a frozen confection being frozen in the form of small discrete ice particles.

2. A frozen confection coating consisting of an aqueous composition having dispersed therein from 4 to 16% by weight of sugar and from 6 to 18% by weight of milk solids, the water content in said composition being between 60 and 85% by weight of said composition and serving as the principal congealing ingredient of said coating and the sugar and milk solids in said coating serving to render the coating coherent and softer than plain ice.

3. A frozen confection coating including an aqueous medium having dispersed therein from 4 to 16% by weight of said medium of sugar and from 6 to 18% by weight of the said medium of milk solids, the water content of said medium being between 60 and 85% by weight of said medium and when applied to a frozen confection being frozen in the form of small discrete ice particles.

4. A coating for frozen confection including an aqueous medium having dispersed therein from 4 to 16% by weight of said medium of sugar, from 6 to 18% by weight of the said medium of milk solids, and from 0.5 to 1.0% by weight of said medium of soy bean flour, said coating when applied to a frozen confection being frozen in the form of small discrete coherent ice particles.

5. A frozen confection coating including an aqueous medium comprising about 10 lbs. of sugar, about 9 lbs. skim milk, about 12 oz. soy bean flour, about 70 lbs. water, salt, and flavoring, and said coating when applied to a frozen confection being frozen in the form of discrete coherent ice particles.

6. A method of coating a frozen confection which includes dipping a body of said confection at a temperature not substantially in excess of 50° F. in a viscous aqueous coating composition comprising water as its chief congealing ingredient and from 4 to 16% by weight of said medium of sugar together with from 6 to 18% by weight of said composition of milk solids.

7. A method of coating a frozen confection which includes dipping said confection into an aqueous coating composition capable of congealing and held at a temperature not substantially in excess of 50° F. said composition including water as its chief congealing ingredient, from 4 to 16% by weight of said composition of sugar, from 6 to 18% by weight of said composition of milk solids, and from 0.5 to 1.0% by weight of said solution of soy bean flour.

8. A method of preparing a frozen confection which method includes dipping said confection into an aqueous coating composition capable of congealing by freezing and held at a temperature between 30° and 50° F., said composition including water as its principal congealing ingredient, from 4 to 16% by weight of said composition of sugar and from 6 to 18% by weight of said solution of milk solids, said composition on freezing forming about said confection an adherent layer of coherent discrete ice particles.

9. A method of preparing a frozen confection which includes dipping said confection into an aqueous coating composition held at a temperature between 30° and 50° F., said composition including about 70 lbs. water, about 10 lbs. sugar, about 9 lbs. skim milk powder and about 12 oz. soy bean flour.

DANIEL GLAZER.